Oct. 4, 1927.
E. M. MAYER
1,644,535
CHILD'S VEHICLE
Filed Dec. 28, 1925
2 Sheets-Sheet 1
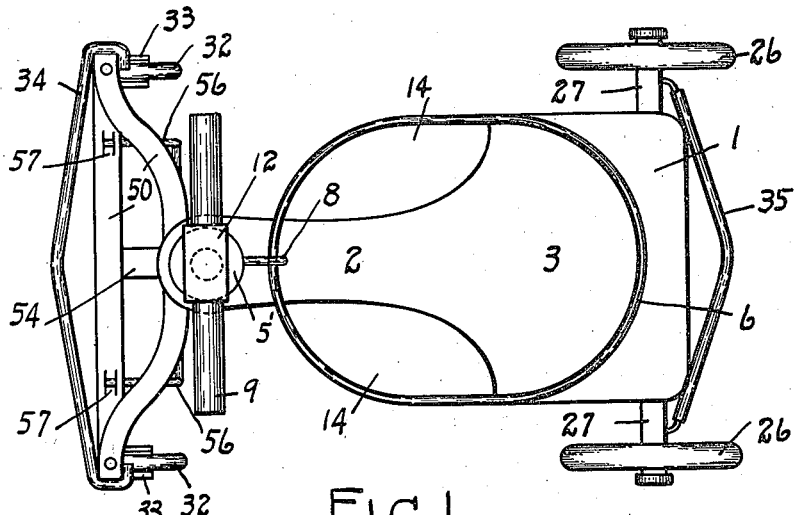
FIG.1.
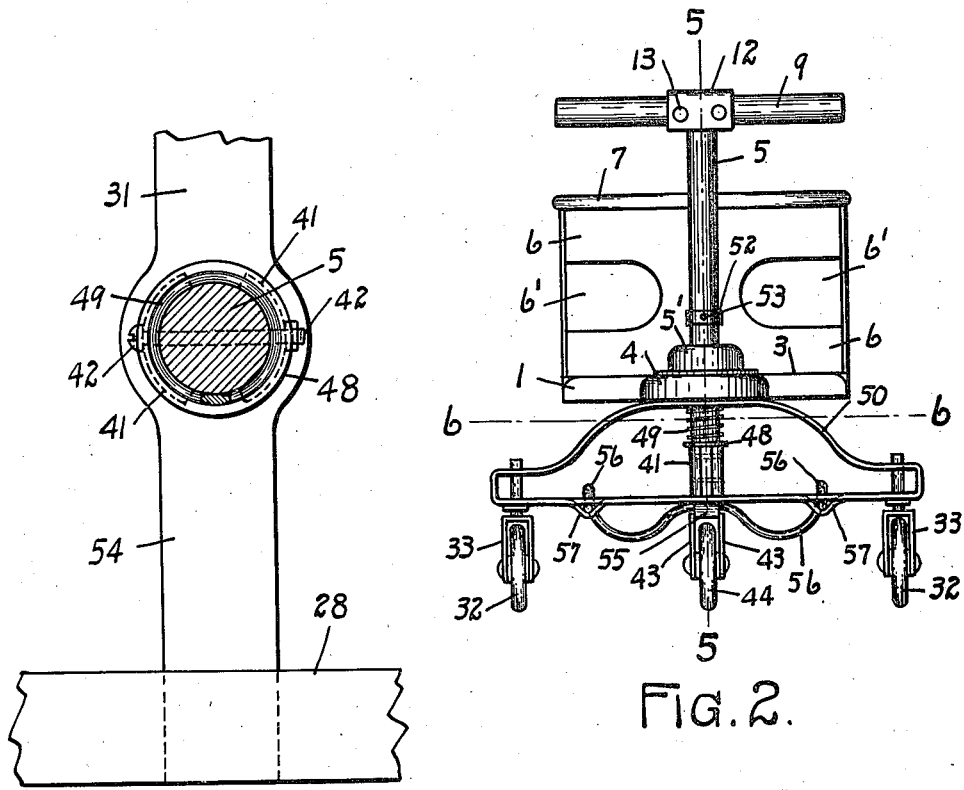
FIG.6.
FIG.2.
INVENTOR.
Emil M. Mayer
By John W. Strehli
ATTORNEY.

Oct. 4, 1927.
E. M. MAYER
CHILD'S VEHICLE
Filed Dec. 28, 1925
1,644,535
2 Sheets-Sheet 2
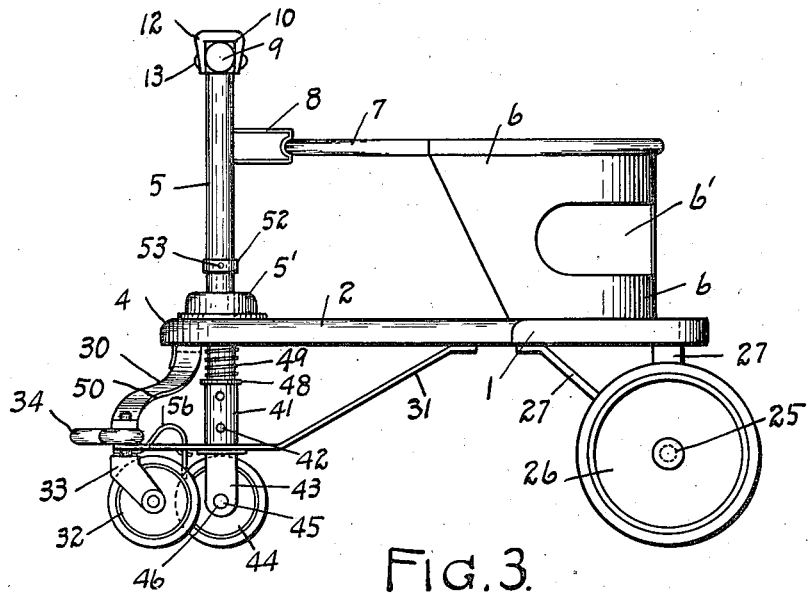
Fig. 3.
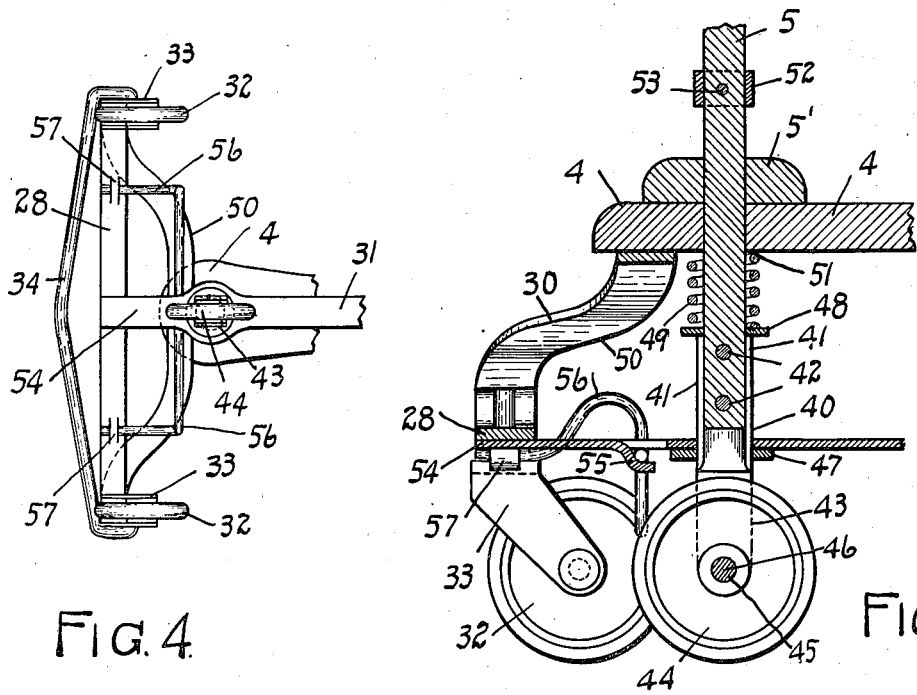
Fig. 4.
Fig. 5.
INVENTOR.
Emil M. Mayer
By John W. Dreher
ATTORNEY.

Patented Oct. 4, 1927.

1,644,535

UNITED STATES PATENT OFFICE.

EMIL M. MAYER, OF CINCINNATI, OHIO.

CHILD'S VEHICLE.

Application filed December 28, 1925. Serial No. 78,044.

My invention relates more particularly to that class of vehicles for small children, known as baby walkers, push cars and kindred vehicles of this class, usually provided with a steering post and handle, which is grasped by the child in using the vehicle and steering the same.

In reference to my invention, I shall refer to a baby walker. These baby walkers are used to assist in teaching small children the art of walking. One style of these baby walkers is shown in my United States Patent No. 1,561,264 of November 10, 1925.

My present invention can be used as a baby walker and can be used as a push car, thus providing a double use for the vehicle.

The main and salient feature of my present invention consists in providing the forward part of the vehicle, in the vicinity of the steering part with a fifth wheel to operate in conjunction with the steering part and the two castor wheels, this fifth wheel also preferably bearing a castor wheel. I mount this fifth wheel at lower extremity of the steering part, and hold it in contact with the floor by a spring tension or by any other suitable means. The two front wheels and this fifth wheel are usually castor wheels and revolve around in all directions; thus they will all turn together and revolve so that when the child has hold of the steering post handle and turns it the fifth wheel will revolve, and it will steer and revolve the other two castor wheels and they will all move and revolve together, the fifth wheel guiding them into the direction indicated by the handle as it turns the fifth wheel at its lower extremity. When the fifth wheel turns the other castor wheels will turn accordingly with it, as they are all set at the same angle.

Another salient feature of my invention resides in the fact that I do not turn the axle on which the front wheels are mounted, the wheels only turning.

My combined baby walker and push car is simple in construction, highly efficient in use and possesses marked utility. The child's vehicle may be used as a baby walker and push car combined, or I may make it to be used as a push car only.

In the accompanying drawing, forming part of this specification;

Fig. 1, is a plan view of my device,

Fig. 2, is a front view of same,

Fig. 3, is a side view thereof,

Fig. 4, is a bottom view of the forward part of the vehicle, shown broken away,

Fig. 5, is a section taken on line 5—5 of Fig. 2, and

Fig. 6, is a section of the steering column or part, taken on line 6—6 of Fig. 2.

I will now describe my invention in detail and also fully set forth the baby walker element of the vehicle, to illustrate its relations to the push car feature of my invention.

In the drawing, 1 represents the body of the vehicle which is narrow at its forward part to form the neck 2, and at the rear forms the seat 3, and it is rounded off at its extreme front 4. The steering post 5 extends upwardly and downwardly from this forward round part of the body part 1, and through same, and is connected to said forward end of said body part in any suitable manner, and passes through a collar 5'. A seat part 6 is connected to the seat 3 of the body part, and a rail or loop 7 is present at the top of this seat part 6 and extends forward toward the post 5; said seat part generally made of metal and having ventilating holes 6' therein; this loop or rail being formed partly by the beaded top edge of the said part 6.

At the forward part, this loop or rail 7 is supportetd in a bracket 8, which is connected to said post and acts as a support and bumper which bracket may be dispensed with, if desired.

At the top of the post 5 I connect in any suitable manner a handle 9 which extends laterally to the right and left from said post 5. This handle is widened at the middle 10 and made of a square of rectangular effect. On this part 10 of the handle, I place the rubber cap or hood 12 in position on the part 10 by the tacks or screws 13. In the present instance this rubber cap or hood covers the top and edge side of the part 10 of the handle as shown.

This surface 12 is made of a rubber or analogous material and is provided for the child to bite upon when teething.

The rear axle is marked 25 and the rear wheels 26, the body being supported on the rear axle by the framework 27.

The forward end of the body is supported on the bolster 50 formed of a cross bar 28 bent back upon itself at its outer edges 29, spaced as shown at 36, and then extending upwardly and backwardly to form an arched part 30, and said body is further supported by a brace rod 31.

This bolster also acts as an axle and the front wheels 32 are supported and swiveled in hangers 33. A front bumper 34 and a rear bumper 35 are also attached to the forward and rear end of the vehicle.

It will be seen that the front bolster 50 supports the body of the vehicle, at its front part, in a vertical line forward of the post 5, and that the wheels 32 in a vertical line forward of the said post 5 and that the entire wheel periphery is forward of said post 5, and that this entire front bolster construction and wheels extend materially forward of the post and its handle, thus a construction is formed, which will prevent the walker from forward tilt or overthrow, presenting a vehicle of this class which is simple, highly efficient, durable and safe, possessing marked utility.

In operating, the child rests upon the seat, and is held in position by the seat part 6 and the loop or rail 7, the child's legs pass through the openings or spaces 14, and the child grips the handle 9, on each side, and by pushing or moving the feet upon the floor, the vehicle is propelled, thus the child is taught the art of walking.

To the bottom of the steering post 5, I attach the brackets 40 having the curvilinear shape 41 at their upper portions through which I place the bolts 42 for securing same to post 5; the lower portions 43 of the brackets 40 are straight, which provides the fork for swiveled fifth wheel 44; this fork has bearing 45 on which the wheel shaft 46 is mounted, the wheel being carried by this shaft.

To the brackets 40, I fasten a washer or turntable 47, which bears against the brace rod 31. A washer 48 rests on the upper part of the brackets 40, holding in compression one end of a spring 49, the other end of said spring bearing against the bottom side of the body part 4, at the point 51. On the post 5 I also mount a collar 52 which is secured thereto by bolt 53 and this collar limits the travel of the post 5 downwardly.

The forward extension 54 is secured to the bolster 28, and in this extension I provide notched finger 55 which supports the middle of a stirrup 56 for supporting the child's feet, when desired; the ends of the stirrups are fastened in the notched clamps 57, and said stirrup is preferably of the shape shown.

It will be readily observed and understood that the fifth wheel 44 is the steering wheel and is generally set back of the line in which the two front wheels 32 are mounted, as said wheels are all castor wheels and they are all swiveled and always are at the same angles when the child's vehicle is moved in a straight line or in a diagonal line or in a curvilinear line; also that the turning of the starting post and handle control the various movements of said wheels, the movement desired being first imparted to the steering post 5. The tension applied to the said fifth or steering post 5 is just enough to keep it properly in contact with the floor so that it will move and revolve readily and easily the same as its companion wheels 32.

While I have described a preferred form of vehicle and steering and guiding means therefor, I wish to be understood as not limiting myself to the specific construction herein shown, but may vary and change the same to some extent without departing from the spirit of my invention, and I wish to be further understood as claiming any such changes and modifications which fall within the scope of this specification and claims.

What I claim as new and my invention and desire to secure by Letters Patent is:—

1. In a child's vehicle, a body formed with an enlarged rear seat portion and a reduced forward portion, wheeled supporting frames for said body, a seat back and side forming member secured on and extending upwardly from the seat portion of said body, and a confining member mounted on and supported solely from said seat forming member and extending forwardly from the upper forward ends thereof and thereacross above the reduced forward portion of the body, the front wheels on the supporting frame being swiveled, a steering post and a swiveled steering wheel, said steering wheel mounted at the lower part of said steering post, the turning of the steering post and swiveled steering wheel forcing the swiveled front wheels and the vehicle to move in any direction.

2. A child's vehicle including a seat, a pair of wheels at the front end and a pair of wheels at the rear end of the seat for supporting the latter, the wheels at one end being of the castor type, a rotatable steering post associated with the seat, and a fifth wheel arranged at the lower end of the steering post and adapted to engage a supporting surface at a point between the wheels and one end of the seat whereby, when the fifth wheel is turned while the vehicle is travelling over a supporting surface, the castor wheels will partake of the movement of the fifth wheel.

3. A child's vehicle as claimed in claim 2, including resilient means for forcing the steering post downwardly.

4. A vehicle as claimed in claim 2, including a coil spring surrounding the steering post and arranged beneath the seat for forcing the steering post and the fifth wheel toward the supporting surface.

5. A child's vehicle as claimed in claim 2, including a bracket formed of a plurality of sections, each section consisting of an upper parti-cylindrical part, and a lower arm, means securing said parti-cylindrical portions of the bracket to the lower end of the steering post, and a shaft for the fifth wheel carried by said arms.

6. A child's vehicle including a platform forming a seat, a rear frame and rear wheels supporting the rear end of the platform, a bolster connected to the front end of the platform and provided at its end portions with bearings having vertical axes, castor wheels having vertical stub shafts arranged in said bearings, a rotatable steering post extending through said platform and arranged rearwardly of said castor wheels, and a fifth wheel connected to the lower end of said post and arranged between the castor wheels, whereby when the steering post turns the fifth wheel, the castor wheels will partake of the movement of the latter.

7. A child's vehicle as claimed in claim 6, including a bracket extending from the bolster to the under side of said platform, said bracket providing a bearing in which the steering post rotates, and a spring arranged on the steering post between the bracket and the platform for forcing the fifth wheel downwardly at all times.

8. A child's vehicle, including a wheel supported seat, some of said wheels being of the castor type to facilitate steering, a rotatable steering post associated with the seat and provided with a fifth wheel adapted at all times to bear against the same supporting surface as the wheels of the seat, and resilient means for forcing the fifth wheel downwardly, whereby when the steering post is turned while the vehicle is travelling, the castor wheels will automatically partake of the movement of the fifth wheel.

9. A child's vehicle, including a platform forming a seat, a rear wheel supported frame carrying the rear end of the platform, a front bolster connected to said platform, castor wheels connected to the front bolster, a bracket connecting the bolster to the platform, a steering post extending through the platform and bracket and arranged to rotate and move axially in the platform, a fifth wheel connected to the lower end of the steering post and arranged between the castor wheels, resilient means for forcing the fifth wheel downwardly, and a stirrup member crossing said bracket and having its ends connected to the bolster.

In testimony whereof, I affix my signature at Cincinnati, Ohio, this 22nd day of December, 1925.

EMIL M. MAYER.